(12) United States Patent
Froissard (10) Patent No.: US 10,423,008 B2
(45) Date of Patent: Sep. 24, 2019

(54) EYEWEAR LENS ATTACHMENT ASSEMBLY (71) Applicant: 3M INNOVATIVE PROPERTIES COMPANY, St. Paul, MN (US)

(72) Inventor: Laurent Froissard, Cranston, RI (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 15/540,271

(22) PCT Filed: Jan. 12, 2016

(86) PCT No.: PCT/US2016/012939
§ 371 (c)(1),
(2) Date: Jun. 28, 2017

(87) PCT Pub. No.: WO2016/115064
PCT Pub. Date: Jul. 21, 2016

(65) Prior Publication Data
US 2018/0004008 A1    Jan. 4, 2018

Related U.S. Application Data

(60) Provisional application No. 62/103,223, filed on Jan. 14, 2015.

(51) Int. Cl.
*G02C 5/02* (2006.01)
*G02C 1/02* (2006.01)
*G02C 5/04* (2006.01)

(52) U.S. Cl.
CPC .............. *G02C 5/02* (2013.01); *G02C 1/02* (2013.01); *G02C 5/04* (2013.01); *G02C 2200/06* (2013.01); *G02C 2200/08* (2013.01)

(58) Field of Classification Search
CPC . G02C 5/02; G02C 5/04; G02C 5/045; G02C 5/008; G02C 2200/06; G02C 2200/08
(Continued)

(56) References Cited

U.S. PATENT DOCUMENTS 2,978,955 A    4/1961   Frommer
4,102,566 A    7/1978   Shelton
(Continued)

FOREIGN PATENT DOCUMENTS

CN        203287638    11/2013
EP          2385416    11/2011
(Continued)

OTHER PUBLICATIONS

International Search Report for PCT International Application No. PCT/US2016/12939, dated Mar. 21, 2016, 2 pages.
(Continued)

*Primary Examiner* — Darryl J Collins (57) ABSTRACT

The present description provides an eyewear lens attachment assembly that provides easy and secure attachment between a lens in a frame. An exemplary eyewear lens attachment assembly described herein includes a lens having a lens opening proximate a nose region, a frame holder having a frame engagement feature and a retainer engagement feature, and a slidable retainer including an outer surface, an inner surface, and a flanged projection extending outwardly from the inner surface. When the flanged projection is positioned through the lens opening, the retainer is slidable between an engaged position in which the retainer is secured to the frame holder and a disengaged position in which the retainer and frame holder may be separated.

15 Claims, 9 Drawing Sheets

(58) Field of Classification Search
USPC .... 351/41, 60, 103, 105, 110, 124, 125, 128
See application file for complete search history.

(56) References Cited

U.S. PATENT DOCUMENTS

| | | | |
|---|---|---|---|
| 4,322,138 | A | 3/1982 | Minart |
| 4,759,622 | A | 7/1988 | Schmidthaler |
| 4,848,893 | A | 7/1989 | Grendol |
| 5,790,230 | A | 8/1998 | Sved |
| 5,907,868 | A | 6/1999 | Schleger |
| 5,971,536 | A | 10/1999 | Chiu |
| 5,975,692 | A | 11/1999 | Pedron |
| 6,027,214 | A | 2/2000 | Graham |
| 6,089,708 | A | 7/2000 | Ku |
| 6,282,727 | B1 | 9/2001 | Lindahl |
| 6,481,845 | B1 | 11/2002 | Gazzara |
| 6,533,412 | B1 | 3/2003 | Wang |
| 6,761,447 | B1 | 7/2004 | Pyo |
| 6,959,989 | B2 | 11/2005 | Holm |
| 7,431,453 | B2 | 10/2008 | Hogan |
| 7,461,935 | B2 | 12/2008 | Collier |
| 7,488,068 | B2 | 2/2009 | Weichel |
| 7,614,741 | B1 | 11/2009 | Chen |
| 7,641,333 | B2 | 1/2010 | Blanshay |
| 7,658,491 | B2 | 2/2010 | Siu |
| 8,550,620 | B2 | 10/2013 | Altemare, Jr. |
| 8,777,403 | B2 * | 7/2014 | Huang ............ G02C 1/04 351/103 |
| 2011/0025974 | A1 | 2/2011 | Schepke |
| 2012/0002158 | A1 | 1/2012 | Jirsa |
| 2012/0105799 | A1 | 5/2012 | Stewart |
| 2013/0258270 | A1 | 10/2013 | Cazalet |
| 2013/0335696 | A1 | 12/2013 | Huang |
| 2014/0233108 | A1 | 8/2014 | Cazalet |
| 2014/0300854 | A1 | 10/2014 | Fox |

FOREIGN PATENT DOCUMENTS

| | | |
|---|---|---|
| FR | 2564603 | 11/1985 |
| WO | WO 2012-106057 | 8/2012 |

OTHER PUBLICATIONS

Zenni® Square Eyeglasses with Magnetic Snap-on Shades, retrieved from the internet on Aug. 25, 2017: http://www.zennioptical.com/eyeglass-magnetic-snapon-sunshades-6499221.html.

European Application 16737689 Supplementary Search Report dated Jul. 31, 2018.

\* cited by examiner

EYEWEAR LENS ATTACHMENT ASSEMBLY

CROSS REFERENCE TO RELATED APPLICATIONS

This application is a national stage filing under 35 U.S.C. 371 of PCT/US2016/012939, filed Jan. 12, 2016, which claims the benefit of U.S. Application No. 62/103,223, filed Jan. 14, 2015, the disclosure of which is incorporated by reference in its/their entirety herein.

TECHNICAL FIELD

The present disclosure is directed to an eyewear lens attachment assembly and, in particular, an eyewear lens attachment assembly including a slidable retainer.

BACKGROUND

Various mechanisms have been provided for attaching an eyewear lens to an eyewear article. For example, eyewear may allow for interchangeability of lenses, to replace a worn lens, or to provide a lens having different properties to suit a particular use. There remains a need for a lens and frame that may be easily, securely and releasably joined.

SUMMARY

The present description provides an eyewear lens attachment assembly having a lens having a lens opening proximate a nose region, a frame holder having a frame engagement feature and a retainer engagement feature, and a slidable retainer including an outer surface, an inner surface, and a flanged projection extending outwardly from the inner surface, the flanged projection positionable through the lens opening. When the flanged projection is positioned through the lens opening, the retainer is slidable between an engaged position in which the retainer is secured to the retainer engagement feature of the frame holder and a disengaged position in which the retainer and frame holder may be separated.

In an exemplary embodiment, the frame attachment feature includes a channel sized to receive a brow portion of an eyewear frame, and the channel may extend generally horizontally between first and second ends of the frame holder. The retainer engagement feature includes an opening, and the opening may include a larger portion and a smaller portion. In various exemplary embodiments, the slidable retainer is slidable between the engaged position and the disengaged position in a generally horizontal direction and/or a generally vertical direction.

In another exemplary embodiment, the present description provides an eyewear lens attachment assembly including a lens having a lens opening proximate a nose region, a frame holder comprising a channel sized to receive a brow portion of an eyewear frame and an opening, the opening comprising a larger portion and a smaller portion, and a slidable retainer including an outer surface, an inner surface, and a flanged projection extending outwardly from the inner surface. The retainer is slidable between an engaged position in which the slidable retainer is secured to the frame holder and a disengaged position in which the retainer and frame holder may be separated by passing the flanged projection through the larger portion of the opening of the frame holder.

In an exemplary embodiment, the frame holder comprises a recess at least partially behind the opening, and a portion of the slidable retainer resides in the recess when the slidable retainer is in the engaged position. In various exemplary embodiments, the slidable retainer is slidable between the engaged position and the disengaged position in a generally horizontal direction and/or a generally vertical direction.

The above summary of the present invention is not intended to describe each disclosed embodiment or every implementation of the present invention. The Figures and the Detailed Description, which follow, more particularly exemplify illustrative embodiments.

BRIEF DESCRIPTION OF DRAWINGS

The present description will be further explained with reference to the appended Figures, wherein like structure is referred to by like numerals throughout the several views, and wherein.

While the above-identified figures set forth various embodiments of the disclosed subject matter, other embodiments are also contemplated. In all cases, this description presents the disclosed subject matter by way of representation and not limitation. It should be understood that numerous other modifications and embodiments can be devised by those skilled in the art which fall within the scope and spirit of the principles of this description.

DETAILED DESCRIPTION

The present description provides an eyewear lens attachment assembly that allows an eyewear lens to be securely and replaceably attached to a frame. The eyewear lens attachment assembly includes a frame holder and a slidable retainer configured to join a lens and a frame. The retainer is moveably engageable with the frame holder between an engaged position and a disengaged position such that a user may quickly and easily join the components. Accordingly, an eyewear lens attachment assembly as described herein allows a user to attach an eyewear lens to a frame without difficult assembly steps.

Figure 1:
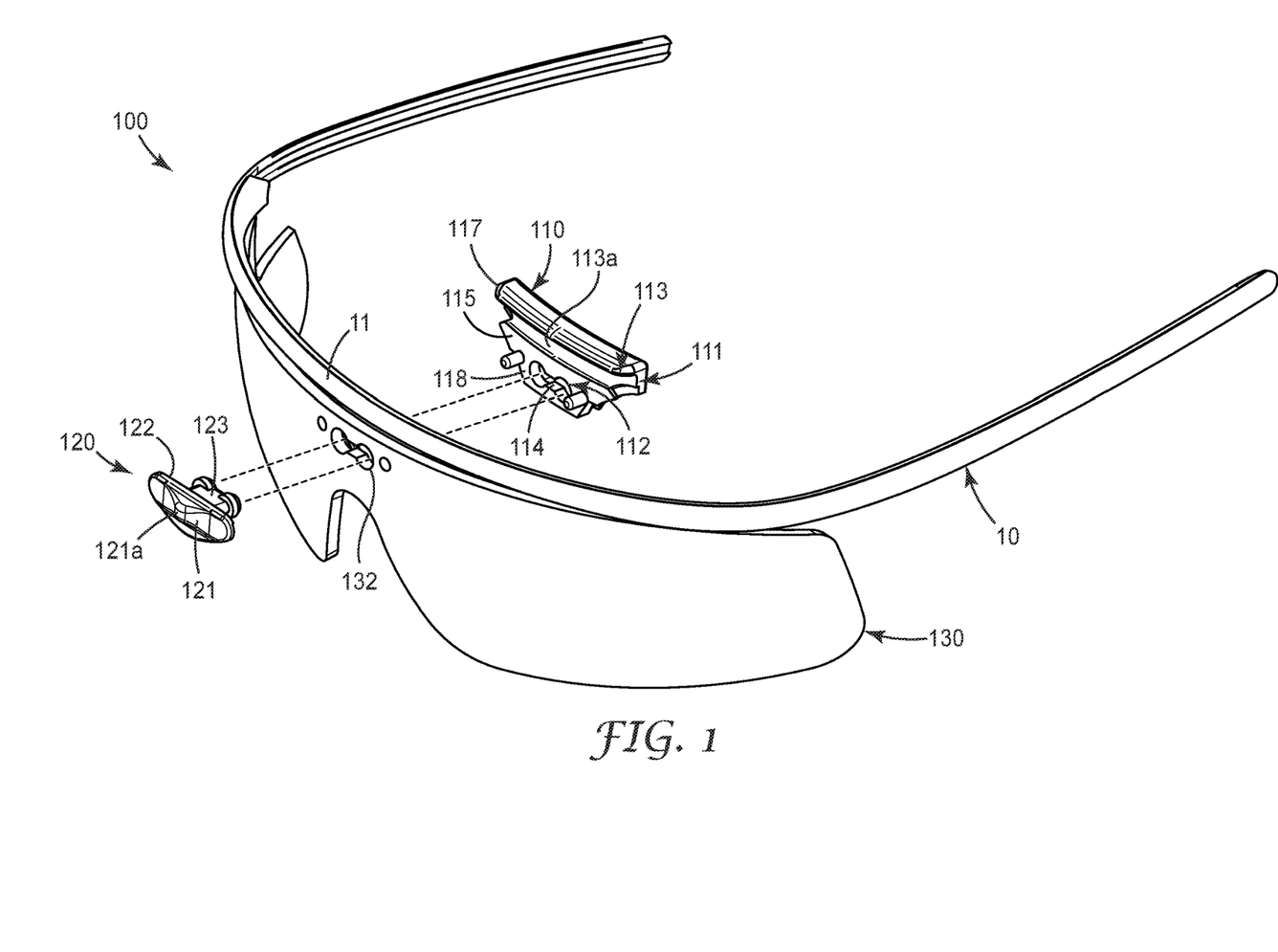
FIG. 1 is an exploded view of an exemplary eyewear lens attachment assembly and a frame according to the present description.

FIG. 1 shows an exploded view of a frame 10 and an exemplary eyewear lens attachment assembly 100 including a frame holder 110, a slidable retainer 120 and a lens 130. Frame holder 110 includes a frame engagement feature 111 and a retainer engagement feature 112. In an exemplary embodiment, slidable retainer 120 includes one or more features, such as an outwardly extending engagement projection 123 that may pass through a lens opening 132 and engage retainer engagement feature 112 of frame holder 110 to maintain lens 130 securely attached to frame 10, as described in greater detail herein.

Frame 10 may be any suitable eyewear frame capable of supporting a lens, such as lens 130, in position in front of a user's eye and/or portions of a user's face. In an exemplary embodiment, frame 10 is a component of a head-wearable electronic device and may support one or more other devices including one or more lenses, display elements, and/or other components.

Lens 130 is a suitable structure through which a user is able to see the surrounding environment. Lens 130 interacts with a user's field of vision, and may substantially block the user's eyes and/or portions of a user's face from external elements. In an exemplary embodiment, lens 130 provides a desired level of impact protection, such as impact protection satisfying, for example, ANSI Z87.1-2010, CSA Z94.3-2007, and/or EN166-2001 standards, in which the lens assembly does not break or become detached when impacted with a steel ball traveling at a specified velocity.

Lens 130 may be made of any suitable material having desired optical properties, impact protection, and/or other characteristics. In various exemplary embodiments, lens 130 is made from a polycarbonate, polyamide, other thermoplastics, other suitable materials as known in the art, and combinations thereof, and may be molded to a desired shape or may be cut or ground to shape from a lens blank.

Figure 2:
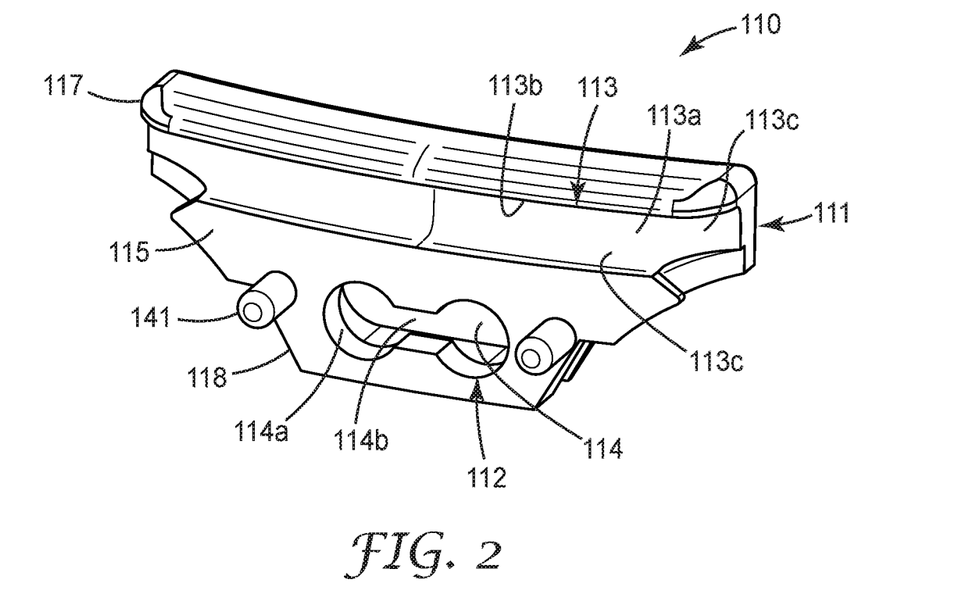
FIG. 2 is a front perspective view of an exemplary frame holder according to the present description.
Figure 3:
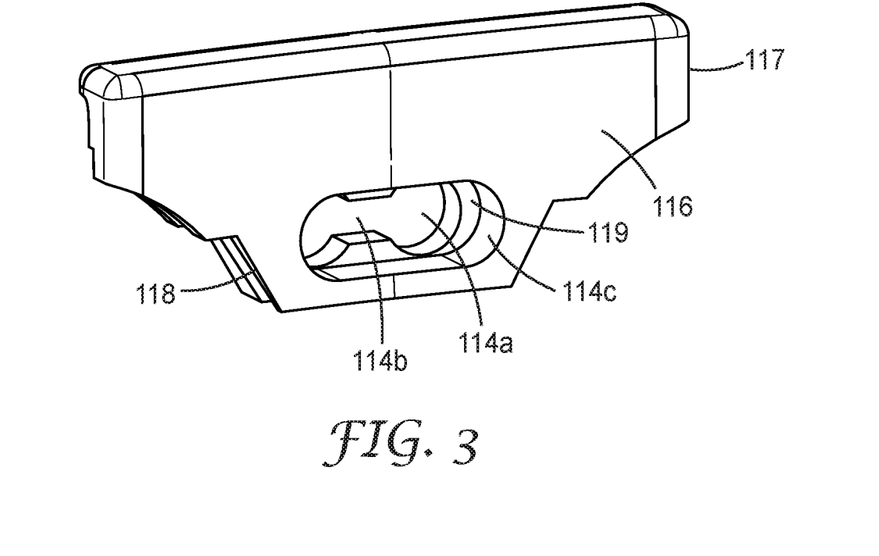
FIG. 3 is a rear perspective view of an exemplary frame holder according to the present description.

FIGS. 2 and 3 show an exemplary frame holder 110 including frame engagement feature 111 and retainer engagement feature 112. Frame engagement feature 111 facilitates attachment of frame holder 110 to a frame, such as frame 10, and retainer engagement feature 112 facilitates attachment of retainer engagement feature 112, for example to securely attach lens 130 between frame holder 110 and slidable retainer 120. In various exemplary embodiments, frame engagement feature 111 and retainer engagement feature 112 may be positioned separately on frame holder 110, and in various exemplary embodiments, frame engagement feature 111 and slidable retainer 120 may substantially overlap and interact.

In an exemplary embodiment, frame holder 110 exhibits a generally triangular shape having an upper portion 117, a lower portion 118, and front and rear faces 115, 116. Frame engagement feature 111 is positioned on front face 115 and exhibits a shape complementary to a portion of a frame that frame holder 110 may be attached to, such as frame 10, and may include a receptacle, protrusion, clip, snap-fit, or other suitable shape. In an exemplary embodiment, frame engagement feature 111 includes a channel 113, shaped to at least partially receive a portion of frame 10, such as brow portion 11. For example, channel 113 may define a recess 113a that frame 10 may fit into between surfaces 113b, 113c, and/or 113d that extends generally horizontally between the first and second sides of frame holder 110. In an exemplary embodiment, recess 113a is slightly smaller than frame 10 such that an interference fit is achieved when frame 10 is positioned in recess 113a. In such embodiments, frictional forces resist relative movement between frame 10 and frame holder 110.

Frame holder 110 includes a retainer engagement feature 112 that facilitates attachment with slidable retainer 120, and may include a receptacle, protrusion, clip, snap-fit, or other suitable shape. In an exemplary embodiment, retainer engagement feature 112 includes at least one opening 114 shaped to receive a complementary feature of slidable retainer 120. For example, opening 114 may be a keyed opening having one or more larger opening portions 114a and one or more smaller opening portions 114b. As described further herein, a portion of slidable retainer 120 may pass through larger opening portions 114a, and slide within opening 114 such that slidable retainer 120 cannot readily pass through larger opening portions 114a.

In various exemplary embodiments, frame holder 110 may be shaped and/or sized such that lower portion 118 is positionable between nose pieces 12 of a frame. In an exemplary embodiment, first and second side portions of frame holder 110 are generally angled and/or curved such that frame holder 110 may be positioned and/or retained between nose pieces 12 of frame 10. For example, an interference fit may be achieved such that frictional forces limit relative movement between frame holder 110 and nose pieces 12, such as nose pads or nose pad arms, of frame 10. Additional receptacles or projections complementary to features of nose pads or nose pad arms may be included to provide additional security.

In an exemplary embodiment, frame holder 110 includes a pocket or recess 114c behind opening 114 (FIG. 3). Pocket or recess 114c provides a space for a portion of slidable retainer 120 extending through opening 114 to reside when assembled, such that slidable retainer 120 does not extend beyond rear face 116 of frame holder 110. Frame holder 110 thus provides an uninterrupted rear face 116 and minimizes edges or surfaces that could cause discomfort for a user.

Frame holder 110 may include one or more locating features to assist a user in aligning frame holder 110, slidable retainer 120, and/or lens 130, during assembly. In an exemplary embodiment, one or more pins 141 extending from front face 115 serve as locating pins and/or provide additional security when slidable retainer 120 is in an engaged position, as described further herein.

Figure 4:
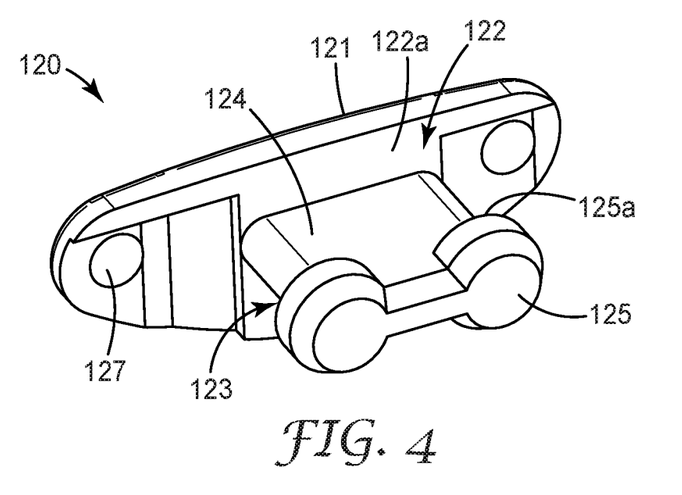
FIG. 4 is a rear perspective view of an exemplary slidable retainer according to the present description.

FIG. 4 shows an exemplary slidable retainer 120. Slidable retainer 120 is attachable to frame holder 110 to secure lens 130 to a frame, such as frame 10. Slidable retainer 120 includes an outer surface 121 and an inner surface 122. Outer surface 121 may include one or more raised or tactile surfaces 121a (FIG. 1) to facilitate handling and manipulation of slidable retainer 120, and provides a surface that allows a user to move slidable retainer 120 between engaged and disengaged positions. Inner surface 122 may contact lens 130, frame holder 110, and/or other components of eyewear lens attachment assembly 100 when assembled. In an exemplary embodiment, inner surface 122 includes a substantially flat portion 122a that may contact an outer surface 135 of lens 130, and includes an outwardly extending engagement projection 123. Outwardly extending engagement projection 123 includes an outwardly extending portion 124 and an enlarged end 125. Enlarged end 125 has at least one dimension that is larger than a corresponding dimension of outwardly extending engagement projection 123. For example, enlarged end 125 may include one or more flanges 125a that are wider than outwardly extending portion 124 to which enlarged end 125 is joined. Enlarged end 125 is sized and shaped to fit through large opening portions 114a of frame holder 110, and not readily pass through smaller opening portions 114b of frame holder 110.

Slidable retainer 120 may include one or more features to facilitate retention of slidable retainer 120 in an engaged position. In an exemplary embodiment, inner surface 122 of slidable retainer 120 includes one or more depressions 127. Depressions 127 are sized to receive a complementary feature of frame holder 110, such as pins 141. When slidable retainer 120 is in an engaged positioned, pins 141 are positioned in depressions 127. To move slidable retainer 120 towards a disengaged position, a user must overcome additional frictional and mechanical resistance to move pins 141 out of depressions 127.

Frame holder 110 and slidable retainer 120 may be made from a variety of suitable materials that allow secure attachment between a lens and a frame. In an exemplary embodiment, frame holder 110 and slidable retainer 120 are formed from a resilient polymer material that may flex and/or stretch to provide secure, frictional engagement with a lens, frame, and/or each other. In various exemplary embodiments, frame holder 110 and/or slidable retainer 120 are made from a polyamide, for example a polyamide 66 such as ZYTEL ST801 available from DuPont Performance Polymers. In other exemplary embodiments, frame holder 110 and/or slidable retainer 120 are made from polyoxymethylene (POM), polycarbonate, other suitable materials as known in the art, and suitable combinations thereof.

In various exemplary embodiments, materials of frame holder 110 and/or slidable retainer 120 may be selected to have a desired tensile modulus or hardness such that frame holder 110 and/or slidable retainer 120 may be readily handled and assembled to securely join a lens and the frame. For example, an exemplary frame holder 110 and/or slidable retainer 120 are made from a material having a tensile modulus, measured according to ISO 527-2, for example, between 900 MPa and 1500, or of about 1100 MPa. An exemplary frame holder 110 and/or slidable retainer 120 are made from a material having a Rockwell hardness between 65 and 75, or of about 69.

Figure 5:
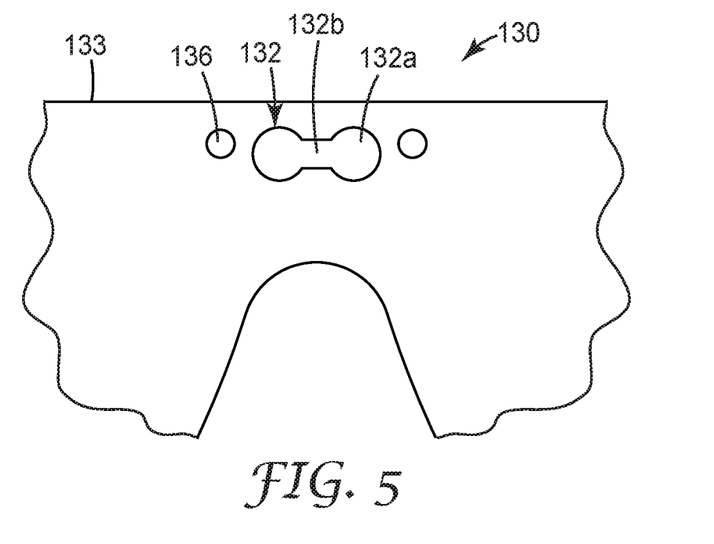
FIG. 5 is a partial front view of an exemplary lens having a lens opening according to the present description.

FIG. 5 shows a partial view of an exemplary lens 130 that may be used with frame holder 110 and slidable retainer 120 to be secured to a frame, such as frame 10. Lens 130 includes an opening 132 that allows portions of frame holder 110 and/or slidable retainer 120 to pass through. In an exemplary embodiment, a shape of opening 132 is similar or the same as a shape of opening 114 of frame holder 110, and includes one or more larger opening portions 132a and one or more smaller opening portions 132b. Enlarged end 125 of slidable retainer 120 may pass through opening 132 of lens 130 and engage with frame holder 110 positioned on an opposite side of lens 130.

In various exemplary embodiments, opening 132 may be positioned at any suitable location of lens 130 such that frame holder 110 and slidable retainer 120 may be positioned on opposite sides of lens 130 and engage through lens opening 132. In an exemplary embodiment, opening 132 is substantially centrally located, and may be positioned near a top edge 133 of lens 130 and/or proximate a nose feature 134. A centrally located opening 132 allows engagement at a central location of lens 130 and frame 10 to provide a balanced and secure attachment.

Lens 130 may further include one or more alignment features, such as alignment openings 136. Alignment openings 136 may be configured to interact with one or more features of frame holder 110 and/or slidable retainer 120 to appropriately position lens 130 during attachment to frame 10. One or both of opening 132 and alignment opening 136 may serve to provide a secure engagement with frame holder 110 and/or slidable retainer 120 and to provide a locating feature that facilitates proper alignment by a user.

Figure 6:
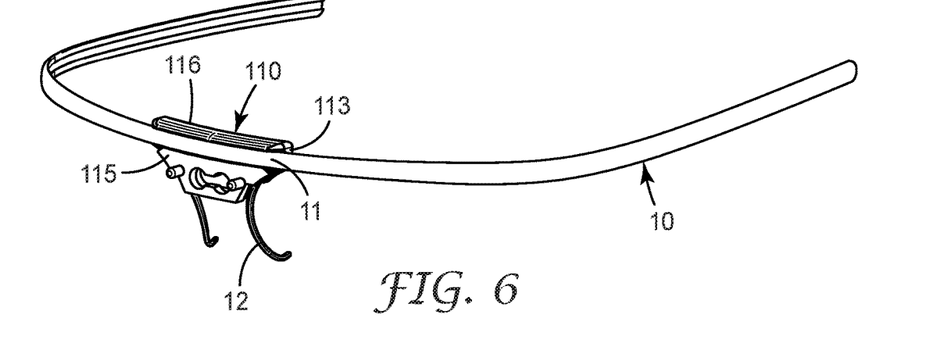
FIGS. 6 and 7 are perspective views showing attachment of a frame and exemplary eyewear lens attachment assembly according to the present description.
Figure 7:
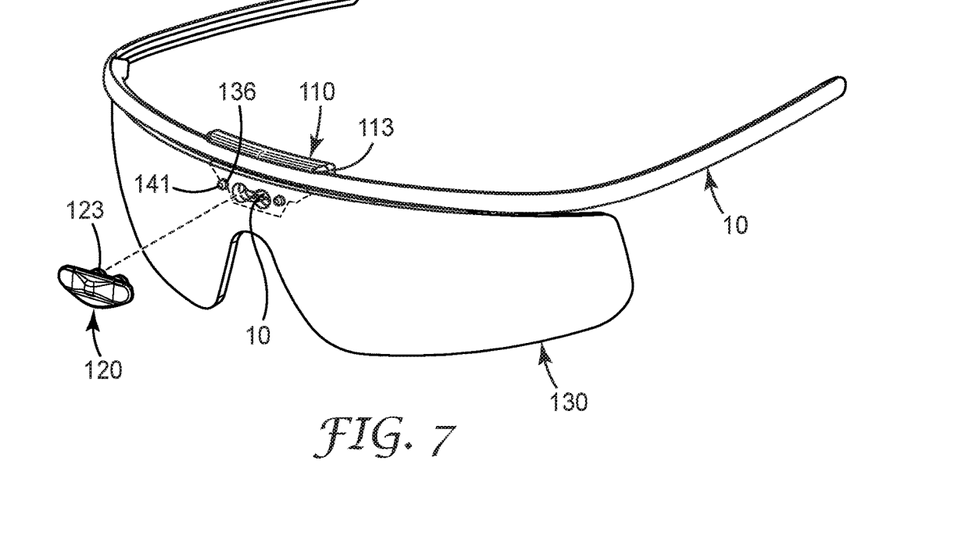

FIGS. 6 and 7 show attachment of exemplary eyewear lens attachment assembly 100 to frame 10. Components of eyewear lens attachment assembly 100 may be joined in any suitable sequence. In an exemplary embodiment, frame holder 110 is positioned at a central location of frame 10 such that front face 115 is outwardly facing and rear face 116 is inwardly facing. A portion of frame 10 is received by channel 113 of frame engagement feature 112, and in some embodiments an interference fit is achieved between frame holder 110 and frame 10 to frictionally retain frame holder 110 in position relative to frame 10. Side portions of frame holder 110 may be curved to be positionable relative to nose pieces 12 of frame 10. In an exemplary embodiment, the side portions contact nose piece 12 to provide additional frictional resistance maintaining frame holder 110 in position relative to frame 10.

With frame holder 110 in an appropriate position relative to frame 10, lens 130 may be centrally positioned for attachment as shown in FIG. 7. In an exemplary embodiment, alignment openings 136 of lens 130 may provide locating features that assist a user in positioning lens 130 relative to frame 10 and/or frame holder 110. For example, pins 141 of frame holder 110 may be aligned with and positioned through alignment openings 136 of lens 130. In addition to serving as a location feature for lens 130, lens 130 may be more easily maintained in position while slidable retainer 120 is brought into engagement with lens 130 and frame holder 110.

Slidable retainer 120 may be attached to secure lens 130 and frame holder 110 to frame 10, as shown in FIG. 7. In an exemplary embodiment, outwardly extending portion 124 and enlarged end 125 of engagement projection 123 are positioned through opening 132 of lens 130 and opening 114 of frame holder 110 such that slidable retainer 120 is in a disengaged position. After insertion, slidable retainer 120 may slide, laterally for example, into an engaged position to securely attach lens 130 with frame 10.

Attachment can occur in any suitable sequence. For example, outwardly extending engagement projection 123 of slidable retainer 120 may be positioned through opening 132 of lens 130 before lens 130 is positioned with frame 10, and slidable retainer 120 and lens 130 may be simultaneously positioned with frame 10 and frame holder 110.

Figure 8:
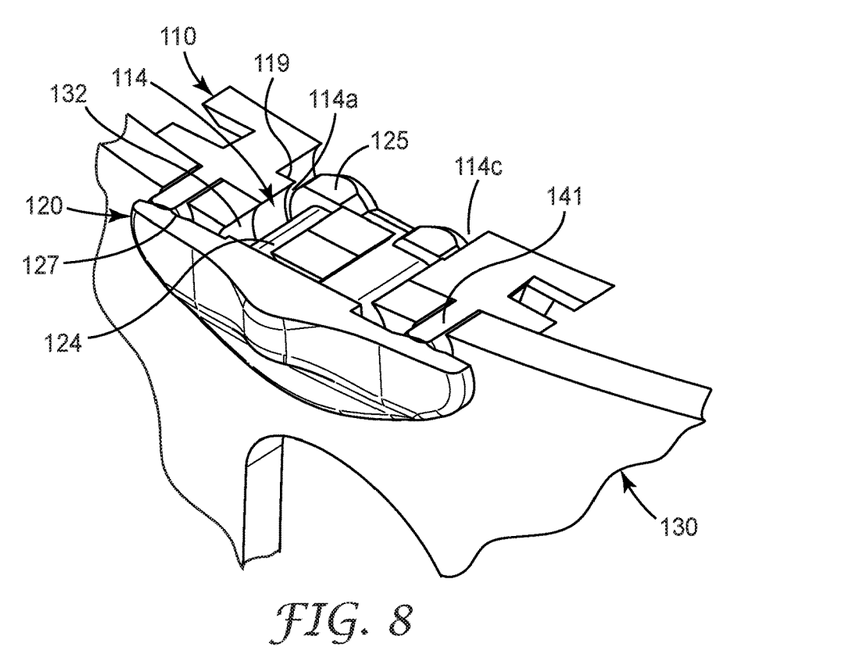
FIGS. 8 and 9 are partial cross-sectional views showing an exemplary eyewear lens attachment assembly having a slidable retainer in a disengaged position and an engaged position, respectively.
Figure 9:
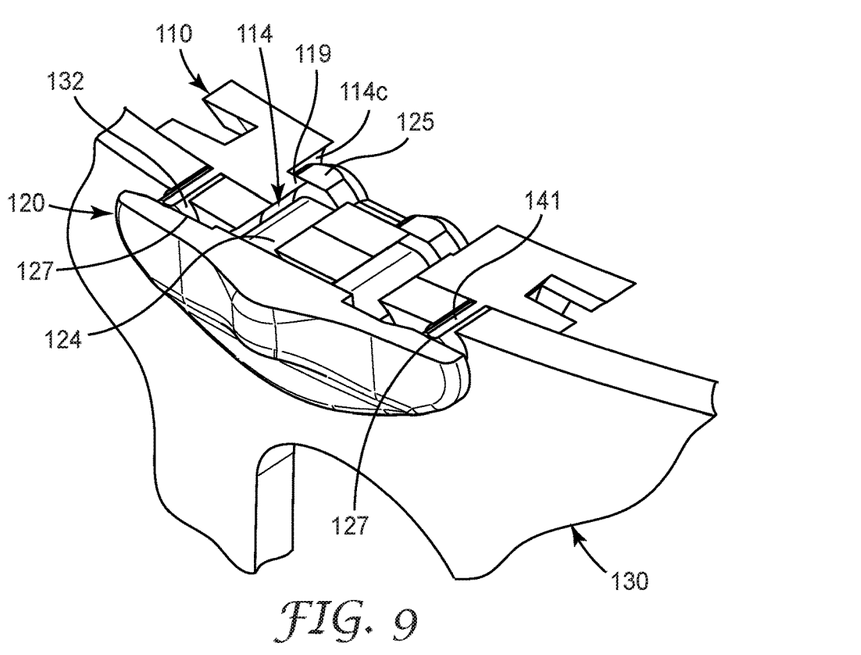

FIGS. 8 and 9 show eyewear lens attachment assembly 100 having slidable retainer 120 in a disengaged position (FIG. 8) and an engaged position (FIG. 9). After being inserted through opening 132 of lens 130 and opening 114 of frame holder 110, outwardly extending portion 124 and/or enlarged end 125 engages lens 130 and frame holder 110. In a disengaged position, enlarged end 125 is aligned with larger opening portions 114a, such that enlarged end 125 may readily pass through openings 114 and 132 to be removed and allow lens 130 to be removed. To secure eyewear lens attachment assembly 100 to frame 10, slidable retainer 120 is able to slide, such as across or along opening 114 of frame holder 110, to an engaged position shown in FIG. 9. In an exemplary engaged position, enlarged end 125 is moved at least partially behind smaller opening portions 114b. Interference with wall 119 defining opening 114 prevents slidable retainer 120 from readily separating from frame holder 110. To remove slidable retainer 120, slidable retainer 120 must first slide laterally in opening 114 such that enlarged end 125 is aligned with larger opening portions 114a. Enlarged end 125 may then pass through larger opening portions 114a to separate slidable retainer 120 from frame holder 110.

In an exemplary embodiment, pins 141 of frame holder 110 engage depressions 127 of slidable retainer 120 when in an engaged position. Contact between pins 141 and inner surface 122 results in a force against inner surface 122 of slidable retainer 120. For example, pins 141 exert a force on slidable retainer 120 that causes enlarged end 125 to exert a similar force against wall 119 of frame holder 110 within recess 114c. Lens 130 is similarly maintained in position between frame holder 110 and slidable retainer 120, and for example may be sandwiched between and/or in direct contact with front face 115 of frame holder 110 and inner surface 122 of slidable retainer 120. In the engaged position, frame holder 110 and slidable retainer 120 are thus securely engaged, and lens 130 is maintained in position. Force created between pins 141 and depressions 127 also results in increased frictional resistance and thus increases a force required by a user to move slidable retainer 120 from the engaged position to a disengaged position. Inadvertent movement is minimized, and a user most exert sufficient force to move slidable retainer 120 to the disengaged position before separating frame holder 110 and slidable retainer 120.

FIGS. 10 through 14 show another embodiment of an exemplary eyewear lens attachment assembly 200. Eyewear lens attachment assembly 200 includes a frame holder 210 and a slidable retainer 220 that may slide vertically relative to each other and/or lens to securely attach a frame 20 and lens 230.

Figure 10:
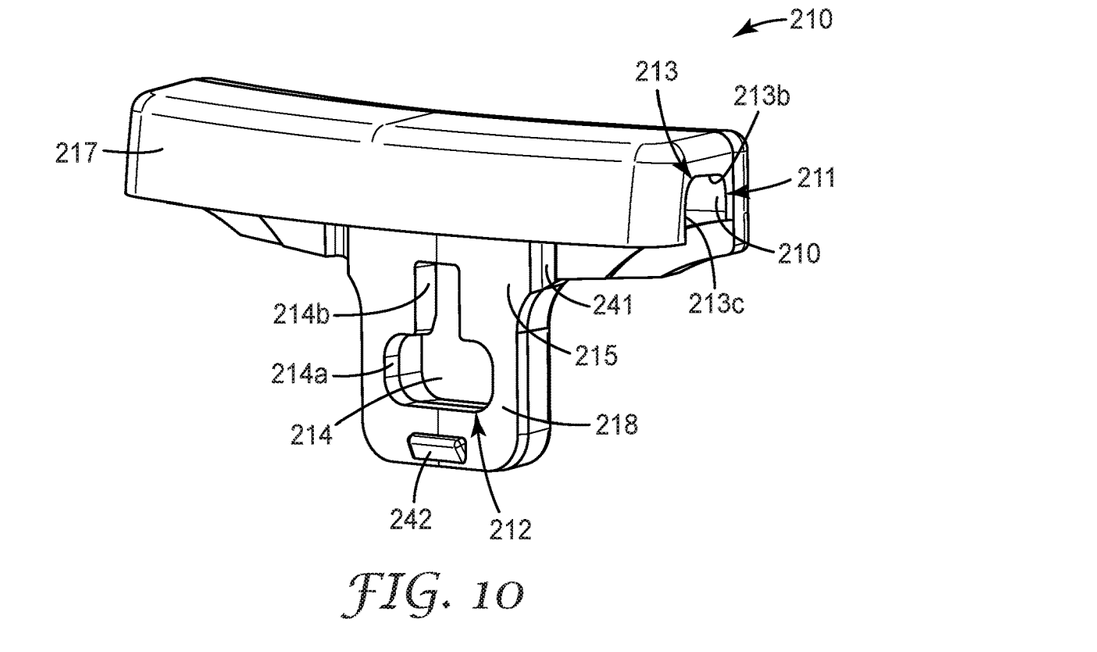
FIG. 10 is a front perspective view of another exemplary frame holder according to the present description.
Figure 11:
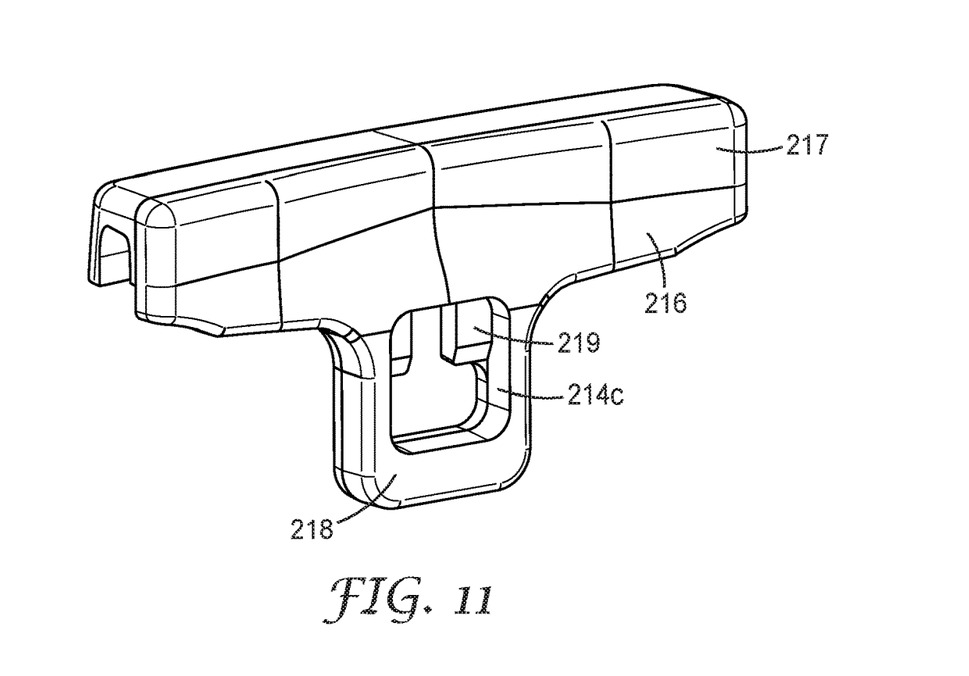
FIG. 11 is a rear perspective view of another exemplary frame holder according to the present description.

FIGS. 10 and 11 show an exemplary frame holder 210. Exemplary frame holder 210 includes features similar to exemplary frame holder 110, as described above, and may exhibit any suitable shape, including a generally triangular shape, or in some embodiments a T shape, having an upper portion 217, a lower portion 218, and front and rear faces 215, 216. Frame engagement feature 211 is positioned on front face 215 and exhibits a shape complementary to a portion of a frame that frame holder 210 may be attached to, such as frame 20, and may include a receptacle, protrusion, clip, snap-fit, or other suitable shape. In an exemplary embodiment, frame engagement feature 211 includes a channel 213, shaped to at least partially receive a portion of frame 20, such as brow portion 21. For example, channel 213 may define a recess 213a that frame 10 may fit into between surfaces 213b, 213c, and/or 213d that extends generally horizontally between the first and second sides of frame holder 210. In an exemplary embodiment, recess 213a is slightly smaller than frame 20 such that an interference fit is achieved when frame 20 is positioned in recess 213a. In such embodiments, frictional forces resist relative movement between frame 20 and frame holder 210.

Frame holder 210 includes a retainer engagement feature 212 that facilitates attachment with slidable retainer 220, and may include a receptacle, protrusion, clip, snap-fit, or other suitable shape. In an exemplary embodiment, retainer engagement feature 212 includes at least one opening 214 shaped to receive a complementary feature of slidable retainer 220. For example, opening 214 may be a keyed opening having one or more larger opening portions 214a and one or more smaller opening portions 214b. As described further herein, a portion of slidable retainer 220 may pass through larger opening portions 214a, and slide within opening 214 such that slidable retainer 220 cannot readily pass through larger opening portions 214a.

In an exemplary embodiment, frame holder 210 includes a pocket or recess 214c behind opening 214 (FIG. 11). Pocket or recess 214c provides a space for a portion of slidable retainer 220 extending through opening 214 to reside when assembled, such that slidable retainer 220 does not extend beyond rear face 216 of frame holder 210. Frame holder 210 thus provides an uninterrupted rear face 216 and minimizes edges or surfaces that could cause discomfort for a user.

Frame holder 210 may include one or more locating features to assist a user in aligning frame holder 210, slidable retainer 220, and/or lens 230, during assembly. In an exemplary embodiment, one or more grooves 241 serve as locating features and/or provide additional security when slidable retainer 220 is in an engaged position, as described further herein.

Figure 12:
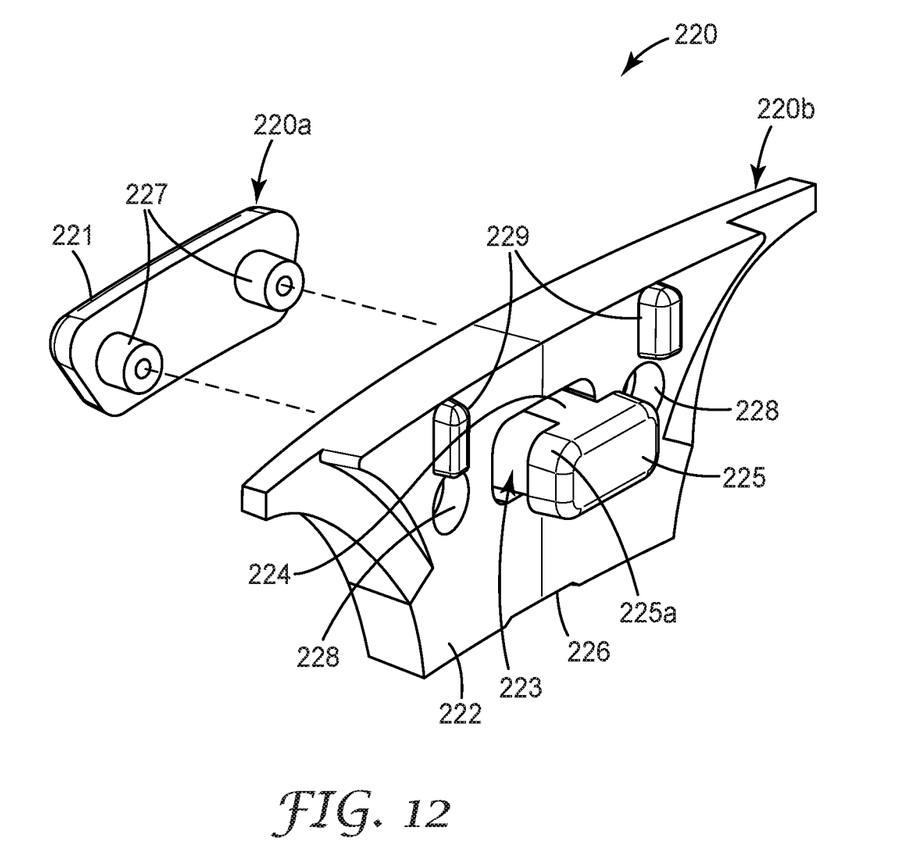
FIG. 12 is a perspective view of an exemplary slidable retainer according to the present description.

FIG. 12 shows an exemplary slidable retainer 220. Slidable retainer 220 is attachable to frame holder 210 to secure lens 230 to a frame, such as frame 20. In various exemplary embodiments, slidable retainer 220 includes first and second portions 220a, 220b that cooperate to attach slidable retainer 220 and lens 230. For example, first portion 220a may include one or more snaps, posts, receptacles or other suitable feature 227 that interacts with one or more complementary snaps, posts, receptacles or other suitable feature 228 of second portion 220b. For example, posts 227 of slidable retainer may pass through one or more openings 232 of lens 230 and first and second portions 220a, 220b secured to attach lens 230 to slidable retainer 220.

In an exemplary embodiment, first and second portions 220a, 220b are separate components that may be attached by a user, for example by mechanical fasteners 243. In other exemplary embodiments, first and second portions 220a, 220b may be joined and/or integrally formed and may, for example include a living hinge that may flex to allow complementary snaps, posts, receptacles or other suitable features 227, 228 to engage one another.

Slidable retainer 220 includes an outer surface 221 and an inner surface 222. Outer surface 221 may include one or more raised or tactile surfaces to facilitate handling and manipulation of slidable retainer 220, and provides a surface that allows a user to move slidable retainer 220 between engaged and disengaged positions. Inner surface 222 may contact lens 230, frame holder 210, and/or other components of eyewear lens attachment assembly 200 when assembled. In an exemplary embodiment, inner surface 222 includes an outwardly extending engagement projection 223. Outwardly extending engagement projection 223 includes an outwardly extending portion 224 and an enlarged end 225. Enlarged end 225 has at least one dimension that is larger than a corresponding dimension of outwardly extending engagement projection 223. For example, enlarged end 225 may include one or more flanges 225a that are wider than outwardly extending portion 224 to which enlarged end 225 is joined. Enlarged end 225 is sized and shaped to fit through large opening portions 214a of frame holder 210, and not readily pass through smaller opening portions 214b of frame holder 210.

Slidable retainer 220 may include one or more features to facilitate retention of slidable retainer 220 in an engaged position. In an exemplary embodiment, inner surface 222 of slidable retainer 220 includes one or more depressions 226. Depression 226 is sized to receive a complementary feature of frame holder 210, such as tab 242. When slidable retainer 220 is in an engaged positioned, tab 242 is positioned in depression 226. To move slidable retainer 220 towards a disengaged position, a user must overcome additional frictional and mechanical resistance to move tab 242 out of depression 226.

Figure 13:
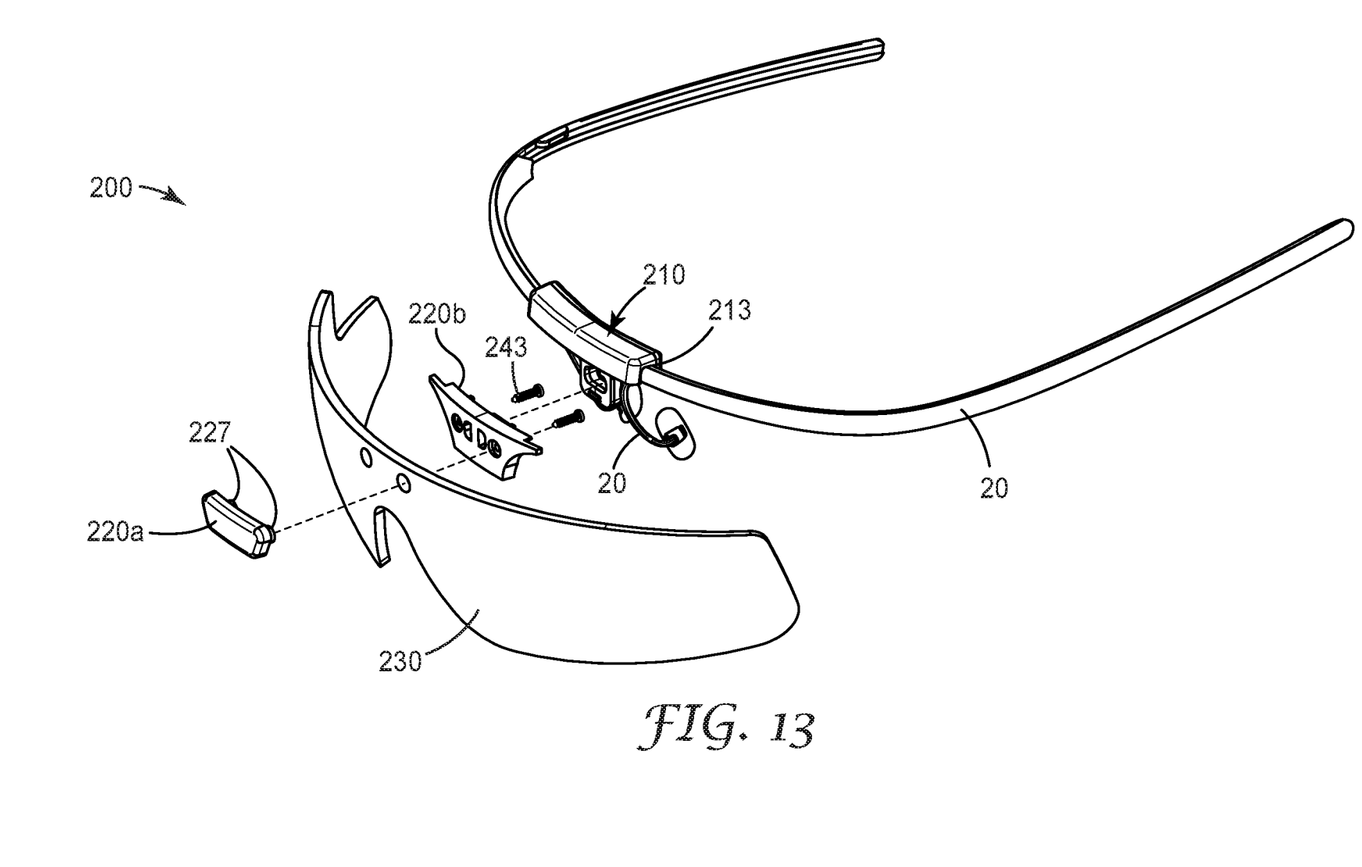
FIGS. 13 and 14 are perspective views showing attachment of a frame and exemplary eyewear lens attachment assembly according to the present description.
Figure 14:
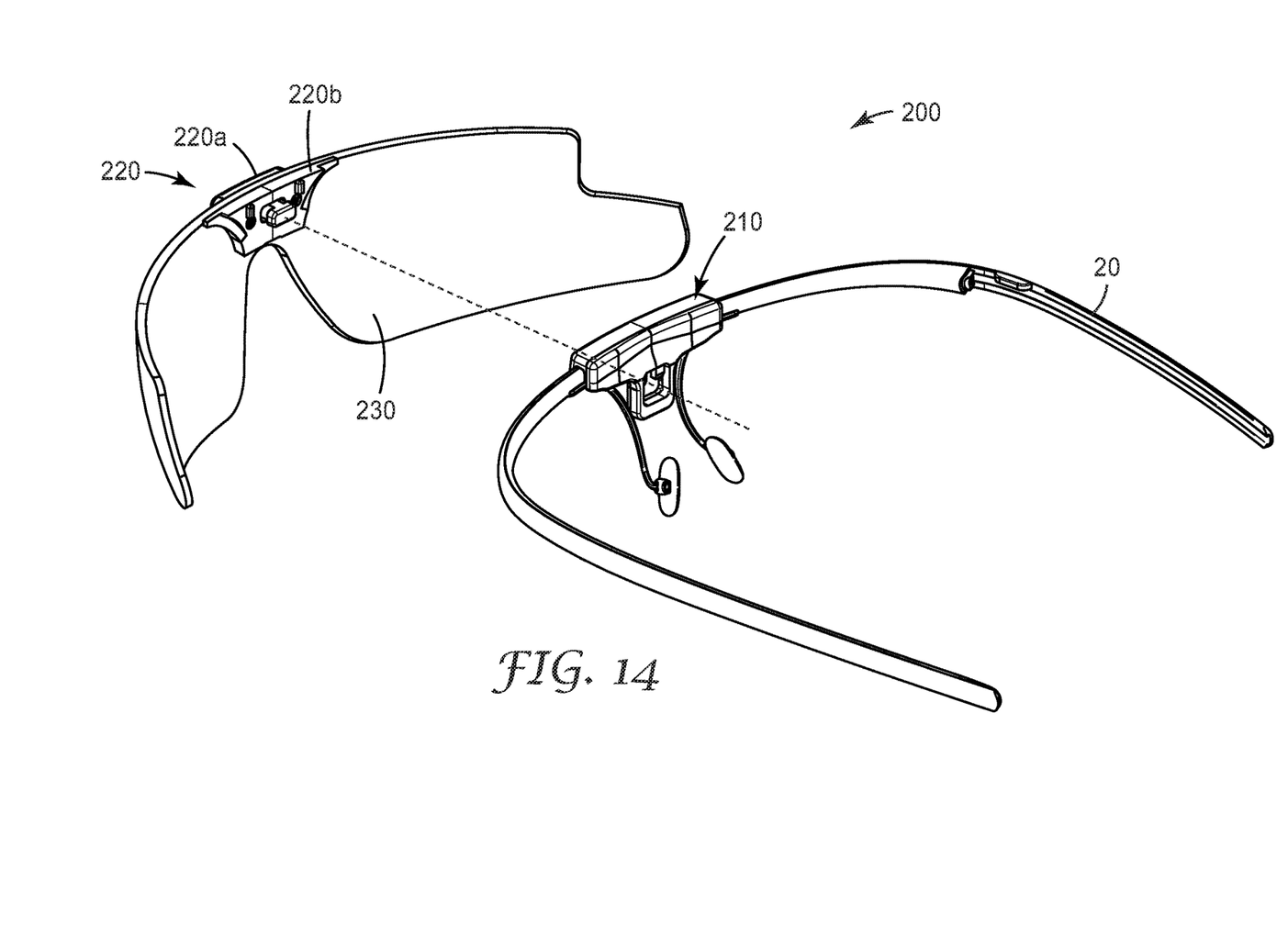

FIGS. 13 and 14 show attachment of exemplary eyewear lens attachment assembly 200 to frame 20. Components of eyewear lens attachment assembly 200 may be joined in any suitable sequence. In an exemplary embodiment, lens 230 is attached to slidable retainer 220, for example by positioning posts 227 through openings 232 in lens 230. In various exemplary embodiments, posts 227 may be secured to complementary receptacles 228 by friction fit, integral snaps, mechanical fasteners such as threaded fasteners 243, or other suitable technique.

Frame holder 210 is positioned at a central location of frame 20 such that front face 215 is outwardly facing and rear face 216 is inwardly facing. A portion of frame 20 is received by channel 213 of frame engagement feature 211, and in some embodiments an interference fit is achieved between frame holder 210 and frame 20 to frictionally retain frame holder 210 in position relative to frame 20. Side portions of frame holder 210 may be curved to be positionable relative to nose pieces 22 of frame 20. In an exemplary embodiment, the side portions contact nose piece 22 to provide additional frictional resistance maintaining frame holder 210 in position relative to frame 20.

Slidable retainer 220 and lens 230 may be centrally positioned for attachment as shown in FIG. 14. In an exemplary embodiment, outwardly extending portion 224 and enlarged end 225 of engagement projection 223 may be positioned through opening 214 of frame holder 210 such that slidable retainer 220 is in a disengaged position. After insertion, slidable retainer 220 may slide, vertically for example, into an engaged position to securely attach lens 230 with frame 20, similar to the disengaged and engaged positions exemplary eyewear lens attachment assembly 100 described above.

In an exemplary embodiment, ribs 229 of slidable retainer 220 engage grooves 241 of frame holder 210 when in an engaged position. Contact between ribs 229 and front face 215 results in a force against front face 215 of slidable retainer 220. For example, ribs 229 exert a force on frame holder 210 that causes enlarged end 225 to exert a similar force against wall 219 of frame holder 210 within recess 214c.

An eyewear lens attachment assembly as described herein provides several features and advantages. Combination of a slidable retainer and a frame holder securely joins a lens and frame while allowing quick and easily attachment, without the need for additional tools or difficult manipulation. Eyewear lens attachment assembly allows a lens, such as a safety shield, to be attached to a frame to provide eye and/or face protection, and may be attached to frames with or without another lens. Accordingly, an eyewear lens attachment assembly as described herein may be particularly useful in providing eye and/or face protection for a user of a head-wearable electronic device that includes additional components and/or lenses, and may be attached to a frame that may not have integral attachment features.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present description should not be limited to the exact details and structures described herein, but rather by the structures described by the language of the claims, and the equivalents of those structures. Any patent literature cited herein is hereby incorporated herein by reference in its entirety to the extent that it does not conflict with the description presented herein.

Any feature or characteristic described with respect to any of the above embodiments can be incorporated individually or in combination with any other feature or characteristic, and are presented in the above order and combinations for clarity only. That is, the present disclosure contemplates all possible combinations and arrangements of various features of each of the exemplary embodiments and components describe herein, and each component may be combined or used in conjunction with any other component as may be desired for a particular application.

What is claimed is:

1. An eyewear lens attachment assembly, comprising:
a lens having a lens opening proximate a nose region;
a frame holder having a frame engagement feature and a retainer engagement feature; and
a slidable retainer including an outer surface, an inner surface, and a flanged projection extending outwardly from the inner surface, the flanged projection positionable through the lens opening;
wherein when the flanged projection is positioned through the lens opening, the retainer is slidable laterally between an engaged position in which the retainer is secured to the retainer engagement feature of the frame holder and a disengaged position in which the retainer and frame holder may be separated.

2. The eyewear lens attachment assembly of claim 1, wherein the frame attachment feature comprises a channel sized to receive a brow portion of an eyewear frame.

3. The eyewear lens attachment assembly of claim 2, wherein the channel extends generally horizontally between first and second ends of the frame holder.

4. The eyewear lens attachment assembly of claim 1, wherein the retainer engagement feature comprises an opening.

5. The eyewear lens attachment assembly of claim 4, wherein the opening comprises a larger portion and a smaller portion.

6. The eyewear lens attachment assembly of claim 1, wherein the slidable retainer is slidable between the engaged position and the disengaged position in a generally horizontal direction.

7. The eyewear lens attachment assembly of claim 1, wherein the slidable retainer is slidable between the engaged position and the disengaged position in a generally vertical direction.

8. The eyewear lens attachment assembly of claim 1, wherein the slidable retainer contacts the frame holder when in an engaged position.

9. The eyewear lens attachment assembly of claim 1, further comprising a frame and a head-wearable electronic device.

10. The eyewear lens attachment assembly of claim 1, wherein the slidable retainer comprises first and second portions joined by a living hinge.

11. The eyewear lens attachment assembly of claim 1, wherein the slidable retainer comprises first and second portions joined by a threaded fastener.

12. An eyewear lens attachment assembly, comprising:
a lens having a lens opening proximate a nose region;
a frame holder comprising a channel sized to receive a brow portion of an eyewear frame and an opening, the opening comprising a larger portion and a smaller portion; and
a slidable retainer including an outer surface, an inner surface, and a flanged projection extending outwardly from the inner surface;
wherein the retainer is slidable between an engaged position in which the slidable retainer is secured to the frame holder and a disengaged position in which the retainer and frame holder may be separated by passing the flanged projection through the larger portion of the opening of the frame holder.

13. The eyewear lens attachment assembly of claim 12, wherein the frame holder comprises a recess at least partially behind the opening, and a portion of the slidable retainer resides in the recess when the slidable retainer is in the engaged position.

14. The eyewear lens attachment assembly of claim 12, wherein the slidable retainer is slidable between the engaged position and the disengaged position in a generally horizontal direction.

15. The eyewear lens attachment assembly of claim 12, wherein the slidable retainer is slidable between the engaged position and the disengaged position in a generally vertical direction.

* * * * *